United States Patent [19]

Plaziaud

[11] Patent Number: 4,517,153

[45] Date of Patent: May 14, 1985

[54] DEVICE FOR REMOVING COOLING FLUID, MAKING IT POSSIBLE TO LOCATE DEFECTIVE ARRAYS IN A NUCLEAR REACTOR IN OPERATION

[75] Inventor: Alain Plaziaud, Sevres, France

[73] Assignee: Novatome, Le Plessis Robinson, France

[21] Appl. No.: 362,821

[22] Filed: Mar. 29, 1982

[30] Foreign Application Priority Data

Apr. 30, 1981 [FR] France .................. 81 08634

[51] Int. Cl.³ ............................................ G21C 17/04
[52] U.S. Cl. ....................................................... 376/253
[58] Field of Search ........................................ 376/253

[56] References Cited

U.S. PATENT DOCUMENTS

| | | | |
|---|---|---|---|
| 3,775,245 | 11/1973 | Delisle et al. | 376/253 |
| 3,856,620 | 12/1974 | Tomabechi | 376/253 |
| 3,941,652 | 3/1976 | Delisle et al. | 376/253 |
| 4,207,922 | 6/1980 | Andrieux et al. | 376/253 |
| 4,248,666 | 2/1981 | Olsson | 376/253 |

Primary Examiner—Sal Cangialosi
Attorney, Agent, or Firm—Pollock, Vande Sande & Priddy

[57] ABSTRACT

Device for removing cooling fluid and for locating defective fuel arrays in a nuclear reactor in operation by detection of fission products in the cooling fluid. The device consists of at least two independent locating modules (12, 14) and of sampling pipes (17, 24) associated with each of the arrays and connected to the modules. For each of the arrays of the core, there is at least one adjacent array in contact with the first array via one of its lateral faces, connected by its sampling pipe (24) to a locating module (14) which differs from the module (12) to which the first array is connected by its pipe (17). The device is particularly applicable to fast fission nuclear reactors cooled by liquid sodium.

4 Claims, 3 Drawing Figures

DEVICE FOR REMOVING COOLING FLUID, MAKING IT POSSIBLE TO LOCATE DEFECTIVE ARRAYS IN A NUCLEAR REACTOR IN OPERATION

FIELD OF THE INVENTION

The invention relates to a device for removing cooling fluid, making it possible to locate defective fuel arrays in a nuclear reactor in operation.

BACKGROUND OF THE INVENTION

Fast fission nuclear reactors, cooled by liquid metal, comprise a core consisting of fuel arrays arranged side-by-side, and in contact via their lateral faces, in a vessel containing the liquid metal for cooling the reactor, which is generally liquid sodium. The liquid sodium for cooling the arrays, or primary sodium, is circulated by means of pumps. The circulating sodium passes through the core from bottom to top, in the longitudinal direction of the arrays, with the result that the exit from the core is in the upper part.

Each of the arrays constituting the core is itself formed of a set of long tubes or needles consisting of a canning material containing the fissile fuel materials or fertile materials.

In this type of reactor, rapid detection of the cracks which can appear in the canning material of some of the arrays, during the operation of the reactor, is very important. These breaks in cans can be detected by demonstrating the presence of fission products in liquid metal constituting the reactor cooling fluid. In fact, in the case of a break in a can, the fission products are released by the fuel material into the cooling fluid in contact with the external surface of the can.

The defective fuel arrays can be precisely located by removing samples of liquid metal coolant in the region of these arrays, near the exit from the core, i.e., in the upper part of the core, through which the heated liquid metal leaves the core.

Thus, a set of sampling pipes is arranged above the core, each of the pipes in this set being associated with one fuel array, and the end of these pipes which is opposite the sampling end arranged above the array is connected to means for identifying and locating the defective arrays by detecting fission products in the cooling fluid.

These identifying and locating means are grouped together to form one or more modules, referred to as can break location (CBL) modules, embedded in the slab covering the vessel above the reactor core.

These modules generally comprise selectors and measuring means, such as neutron counters, which make it possible successively to analyze the samples removed from each of the arrays, and to determine those arrays for which the cooling fluid contains fission products representing a leak in the array in question.

In the case of the fast fission nuclear reactors currently being constructed, the number of arrays in the core is generally of the order of 500, which requires the presence of the same number of sampling tubes connected to the selecting and measuring means.

It has therefore seemed preferable to use several modules, and the sampling pipes corresponding to the arrays located in a given region of the core and connected to each of these modules.

The locating modules comprise moving or fragile components, such as the sample selectors, the pumps for circulating the liquid metal, and the neutron detectors, which must remain functional throughout the operating period of the reactor. These modules can therefore be subject to breakdowns or shutdowns, with the result that the monitoring of a whole region of the core may be temporarily interrupted.

This is incompatible with continuous operation of the reactor under very good safety conditions.

SUMMARY OF THE INVENTION

The object of the invention is thus to propose a device for removing cooling fluid and for locating defective fuel arrays in an nuclear reactor in operation, this reactor comprising a core consisting of fuel arrays arranged side-by-side, and in contact via their lateral faces, in a vessel containing the reactor cooling fluid circulated by a pumping means so as to pass through the core in the longitudinal direction of the arrays, the device comprising means for identifying and locating the defective arrays by detecting fission products in the cooling fluid, these means forming one or more locating modules, and pipes for removing cooling fluid, associated with each of the arrays, independently joining each of the zones located at the exit from each of the arrays to the locating modules, and conveying the cooling fluid from the exit from the core to the modules, thus sampling and locating device being intended to permit continuous monitoring of the whole of the reactor core, even if one of the locating modules experiences a temporary shutdown caused by a breakdown.

For this purpose, the sampling device according to the invention comprises at least two totally independent locating modules, and, for each of the arrays of the core, there is at least one adjacent array, i.e., an array located in contact with the first array via one of its lateral faces, which is connected by its sampling pipe to a locating module different from the module to which the first array is connected.

In order to provide a clear understanding of the invention, an embodiment of a sampling and locating device according to the invention, for the case where two modules are used to monitor the whole of the core and for the case where six independent modules are used for this monitoring, will now be described with reference to the attached drawings.

DETAILED DESCRIPTION

Figure 1:
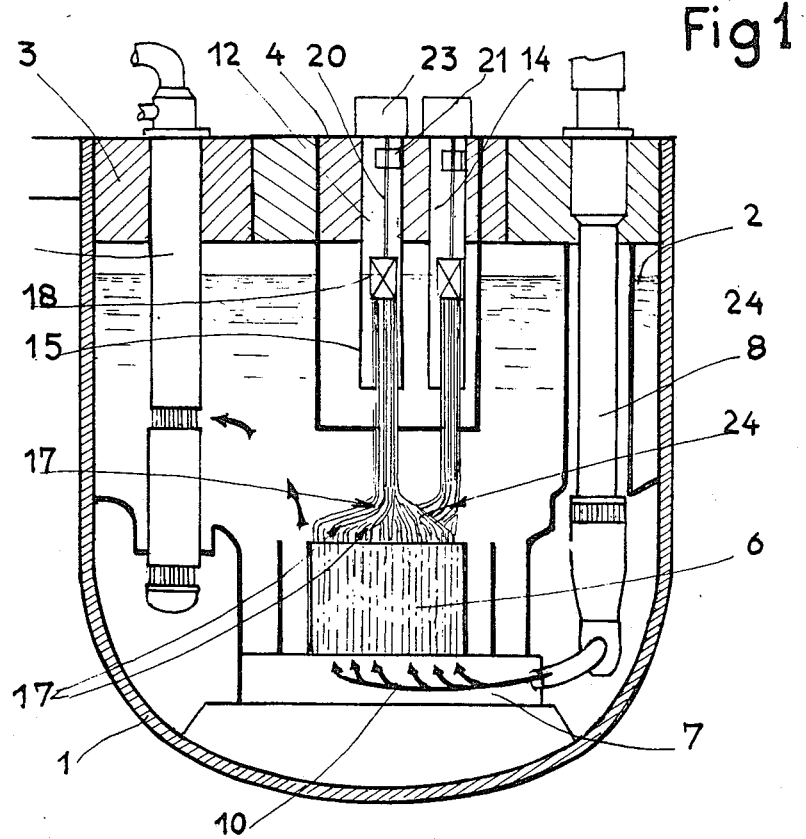
FIG. 1 diagrammatically shows a view in section, through a vertical plane, of the reactor vessel containing the core above which the sampling and locating device according to the invention is located.

FIG. 1 shows the vessel 1 of an integrated-type fast fission nuclear reactor.

The vessel is closed by a thick slab 3 and contains liquid sodium, which constitutes the cooling fluid, up to the level 2.

The core 6 of the reactor, which rests on a bed 7, consists of arrays which are long relative to their transverse dimensions and are arranged vertically side-by-side so that their lateral faces are in contact.

Figure 2:
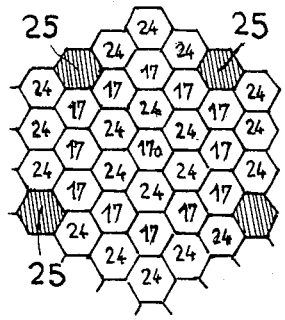
FIG. 2 is a diagram of the distribution of the arrays inside the core, showing the arrays connected respectively to one or the other of two locating modules monitoring the whole of the core.
Figure 3:
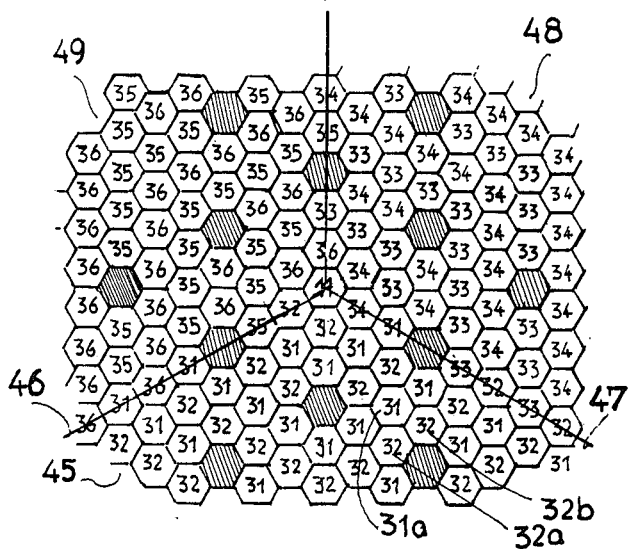
FIG. 3 is a diagram of the distribution of the arrays inside the core, for the case where the core is monitored by six independent locating modules.

FIGS. 2 and 3 show the cross-section of these arrays, which is hexagonal in shape.

Pumps, such as 8, are also arranged inside the vessel; they are immersed in the liquid sodium and enable the latter to circulate inside the core, from bottom to top, as indicated by the arrows 10.

Modules 12 and 14, making it possible to remove cooling fluid and locate the defective arrays inside the core, are arranged above the core 6.

The module 12 will be described in greater detail, the modules 12 and 14 being identical.

The module comprises a casing 15 fixed to the rotating plug 4 and immersed in the liquid sodium. It carries a set of sampling tubes 17, one end of which is in communication with the internal part of the module. The other end of these tubes 17 emerges above the core in the exit zone of the heated liquid sodium which has passed through the core.

Each of the tubes 17 is arranged so as to emerge vertically to an array of the core. Conversely, a sampling tube is associated with each of the arrays forming the core, the inlet end of this tube being vertical to the array, at the exit from the latter.

In this way, each of the tubes 17 can collect the liquid sodium which has passed through the array to which it is vertical.

Inside the casing 15 of the module 12, these tubes are connected to a selector 18, which makes it possible to connect each of the tubes 17 successively to a conveyor tube 20, inside which suction is created by a pump 21. The tube 20 and the pump 21 make it possible to convey the samples of liquid sodium successively removed vertically to the arrays of the reactor, to a measuring instrument 23, which makes it possible to detect the presence of any fission products in the sample of liquid sodium.

Precise identification of the position of the selector makes it possible to identify the position of the sampling tubes and hence of the arrays for which fission products are detected in the sample of liquid sodium.

In the embodiment shown in FIGS. 1 and 2, the sampling tubes form two different sets, the sampling tubes forming one of the sets being connected to a first locating module 12 and the sampling tubes forming the second set being connected to the locating module 14.

As shown in FIG. 2, each of the arrays forming the reactor core is connected by a single sampling pipe to either one or other of the two locating modules.

The set of sampling pipes connected to the locating module 12 is denoted by the reference 17 and the set of sampling pipes connected to the locating module 14 will be denoted by the reference 24.

FIG. 2 shows, for a portion of the core located around the central part of the latter, the hexagonal cross-sections of the various arrays forming this part of the core, and the set of sampling pipes to which the sampling pipe associated with each array belongs is indicated for this array.

It is seen that the arrangement of the various pipes belonging to the set 17 or to the set 24 is determined as follows.

If the sampling pipe of the central array of the core 17a is a pipe of the set 17, the pipes associated with the six arrays surrounding the array 17 form part of the set 24, whereas the twelve arrays surrounding the previous six arrays are associated with pipes 17, and so on, each of the successive rings of arrays possessing sampling pipes belonging successively to the set 17 and to the set 24.

However, it is seen that some of the locations are occupied by control sets, the cross-section of which is identical to the cross-section of an array. There is no sampling pipe arranged vertically to these locations occupied by control sets 25. When the nuclear reactor is in operation, with the sodium circulating in the core, inside each of the arrays in the longitudinal direction, diffusion of the liquid metal takes place at the exit from the core, and this is enhanced by radially directed currents moving from the center of the reactor core towards its periphery.

The samples removed by the pipes 17 and 24 do not therefore consist entirely of sodium which has passed through the array to which they are vertical.

Slight mixing therefore takes place between the fluid which has passed through a particular array and the fluid which has passed through the adjacent arrays. This mixing can amount to a few percent to a few tens of percent of the amount of liquid metal constituting the sample removed vertically to an array, depending on the quality of the sampling, the size of the array and the location of the latter in the core.

If reference is made to the arrangement of the arrays shown in FIG. 2, it is seen that any sample removed by one of the pipes 17 thus contains at least a few percent of liquid metal which has passed through an array associated with a sampling pipe 24, and that conversely, any sample removed with a pipe 24 contains a few percent of liquid metal which has passed through an array associated with a pipe 17.

In this way, if, for example, the module 12 experiences a shutdown, the module 14 receives, by virtue of the tubes 24, samples containing a few percent of liquid metal which has passed through the arrays associated with the sampling pipes 17 connected to the inoperative module 12.

In this way, it is still possible to monitor the whole of the core, by virtue of the distribution of the sampling pipes as shown in FIG. 2.

FIG. 3 shows a portion of the core of a fast fission reactor cooled by liquid sodium, for the case where six independent locating modules, analogous to the modules 12 and 14 shown in FIG. 1, are used for detecting and locating the defective arrays.

These six modules, denoted by the references 31, 32, 33, 34, 35 and 36, are each associated with a portion of the core corresponding to one third thereof. For example, the modules 31 and 32 are associated with the lower portion 45 of the core within the 120° dihedral angle shown by the half-lines 46 and 47 in the drawing of FIG. 3.

Inside this portion of the core, the fuel arrays of hexagonal cross-section are associated with sampling pipes connected either to the module 31 or to the module 32, the arrays associated with a sampling pipe connected to the module 31 carrying this reference 31 and the arrays associated with a sampling pipe connected to the locating module 32 carrying the reference 32.

The arrays associated with sampling pipes connected to one or the other of these sampling modules 31 and 32 are arranged over successive portions of rings between the two planes 46 and 47. The same applies to the arrays located in the portion 48 of the core, the sampling pipes of which are connected either to a locating module 33 or to a totally independent locating module 34.

The arrays associated with pipes connected to the module 33, and the arrays associated with the pipes connected to the module 34, respectively, are arranged over concentric portions of rings surrounding the centre of the core.

The same also applies in the third part 49 of the core, in which the arrays are connected either to a locating module 35 or to a totally independent module 36.

The diffusion of the stream of sodium at the exit from the arrays of the core thus permits mixing of the sodium which has passed through a particular array with a few percent of sodium which has passed through the adjacent arrays connected to a totally independent locating module.

In this way, if one or the other of the locating modules is inoperative, it is still possible for all the arrays of the corresponding portion of the core to be monitored, since the module which remains operative detects fission products in samples containing a few percent of sodium originating from the arrays associated with the inoperative module.

Exact location of the defective array is still possible even if this array is associated with a pipe connected to an inoperative locating module, because all the measurements relating to the fission products in the liquid sodium will have values which are very much smaller than the values usually recorded for leaks in an array associated with a sampling pipe connected to a module which is operating normally.

These values will be, for example, of an order of magnitude smaller than the usual values. On identifying the arrays for which these small values are recorded, for example 32a and 32b in FIG. 3, it is easy to determine that there is a break in the array 31a, because the liquid sodium preferentially diffuses from the center towards the periphery of the core.

In the event where the locating module 31 is inoperative, it is therefore still possible, by virtue of the locating module 32, to determine possible leaks of fission products in the arrays associated with sampling pipes connected to the module 31.

The same obviously applies in the other parts of the core, if one of the two locating modules associated with this portion of the core becomes inoperative.

In the evaluation of the measurements, if all the locating modules are operative, it is obvious that the largest values measured are taken into account, these corresponding to direct sampling above an array in which there is a break in a can.

It is seen that the main advantage of the device according to the invention is that it makes it possible to locate the defective arrays even when a locating (CBL) module has broken down.

It is possible to envisage any distribution of the sampling pipes above the arrays of the core, instead of a ring distribution such as that which has just been described. However, it is necessary in all cases to have an arrangement such that a particular array of the core is in contact, via at least one of its faces, with another array, the sampling pipe of which is connected to a locating module which is different from the module to which the sampling pipe arranged above the first array is connected.

Preferably, the first array should be in contact with at least one array the sampling pipe of which is connected to another locating module via one of its faces directed towards the outside of the core. In fact, the sodium diffuses preferentially from the center to the periphery of the core.

The device according to the invention can also be applied in the case of arrays which do not have a hexagonal cross-section, e.g., in the case where the arrays are distributed in a square mesh.

The locating modules can be of any construction; only the manner in which these modules group together the sampling pipes of the various arrays of the core is important for carrying out the invention. The core can be divided up in any manner into sub-units containing the same number or different numbers of arrays, provided that at least two locating modules are associated with each monitored zone of the core, these modules being connected to the arrays by sampling pipes arranged in a distribution which permits mixing with the liquid sodium which has passed through the arrays connected to different modules. For each of the monitored zones of the core, it will be possible to use two, three, four or more locating modules, depending on the space available for these modules and the desired locating accuracy. It is preferable, however, to use a minimum number of modules, i.e. two modules per zone monitored.

Finally, the device according to the invention is applied in all cases where it is desired to detect, very rapidly, defective fuel arrays in a nuclear reactor in operation, by removing cooling fluid from this reactor, which may be an integrated-type or loop-type reactor.

I claim:

1. In a fast neutron nuclear reactor comprising a core consisting of fuel assemblies arranged side by side with their lateral faces in contact in va vessel containing a reactor cooling fluid circulated by means of pumping, so as to traverse the core in the longitudinal direction of said assemblies, and a device incorporating means for detecting and localizing defective assemblies by detecting fission products in the cooling fluid, consisting of at least one localizing module and sampling conduits for abstracting the cooling fluid, each being associated with a fuel assembly, independently joining each of the zones situated at the exit of each of said assemblies to the localizing module and assuring the transport of said cooling fluid from the core exit as far as said modules, the improvement consisting of at least two completely independent localizing modules and an arrangement of the sampling conduits joining the exit of said assemblies to said modules such that, for each assembly of said core, there is at least one adjacent assembly in contact through the intermediary of one of its lateral faces, which is connected by its sampling conduit to a localizing module different from the module to which the first assembly is connected by its sampling conduit.

2. The improvement according to claim 1, wherein said core is divided into at least two parts, each comprising a set of assemblies, sampling conduits being associated with the assemblies of a set connected to one or the other of two localizing modules which are independent of the localizing modules to which the sampling conduit associated with the assemblies of the other sets are connected.

3. The improvement according to claim 2, wherein said core is divided into three parts, comprising three pairs of totally independent localizing modules, each associated to the set of assemblies in a part of said core, the sampling conduits of which are connected to either of the two localizing modules of the corresponding part of said core.

4. The improvement according to any one of claims 1 to 3, the sampling conduits of said assemblies being connected to one or the other of two independent localizing modules, respectively, arranged over rings coaxial with the axis of said core.

* * * * *